United States Patent
Zaghib et al.

(10) Patent No.: US 6,974,551 B2
(45) Date of Patent: Dec. 13, 2005

(54) HYDROPHOBIC COMPOSITION AND USE ON A SUBSTRATE FOR PREVENTING ICE FORMATION AND CORROSION

(75) Inventors: Karim Zaghib, Longueuil (CA); Fernand Brochu, Longueuil (CA); Abdelbast Guerfi, Brossard (CA); Kimio Kinoshita, Cupertino, CA (US)

(73) Assignee: Hydro Quebec, Montreal (CA)

( * ) Notice: Subject to any disclaimer, the term of this patent is extended or adjusted under 35 U.S.C. 154(b) by 0 days.

(21) Appl. No.: 10/381,840

(22) PCT Filed: Oct. 2, 2001

(86) PCT No.: PCT/CA01/01408

§ 371 (c)(1),
(2), (4) Date: Nov. 12, 2003

(87) PCT Pub. No.: WO02/28981

PCT Pub. Date: Apr. 11, 2002

(65) Prior Publication Data

US 2004/0077770 A1 Apr. 22, 2004

(30) Foreign Application Priority Data

Oct. 2, 2000 (CA) ............................................. 2321345

(51) Int. Cl.⁷ ............................. C09K 3/18; C08K 3/04; C08L 27/12; C08L 27/16; C08L 27/18
(52) U.S. Cl. ............................... 252/70; 106/2; 106/13; 106/14.44
(58) Field of Search ........................... 106/2, 13, 14.44; 252/70

(56) References Cited

U.S. PATENT DOCUMENTS 4,477,608 A 10/1984 Babler et al.

FOREIGN PATENT DOCUMENTS

| EP | 0 829 514 A | 3/1998 |
| GB | 2308368 A | 6/1997 |
| WO | 01/62666 A1 | 8/2001 |

OTHER PUBLICATIONS

Tanford, Charles, *The Hydrophobic Effect: Formation of Micelles and Biological Membranes*, 1973, pp. 1–3, A Wiley–Interscience Publication, no month.

Alger, Mark S. M., *Hydrophobic Bond*, Polymer Science Dictionary, 1997, p. 211, Elsevier Applied Science, no month.

Zaghib, Karim; Nadue, Gabrielle; and Kinoshita, Kimio, *Effect of Graphite Particle Size on Irreversible Capacity Loss*, Journal of the Electrochemical Society, Jun. 2000, vol. 3, No. 6, pp. 2110–2115.

Primary Examiner—Anthony J. Green

(57) ABSTRACT

Graphite has a lubricating property resulting from its laminar structure in two planes, basal and edge plane. The basal plane is hydrophobic. The use of graphite or carbon treated at high temperature in a composite or coating (paint) whereof the privileged orientation of particles is basal enables to cause the coating to be water-repellent. Said property enables to prevent or reduce ice accumulation as well as corrosion on electrical installations.

26 Claims, 1 Drawing Sheet

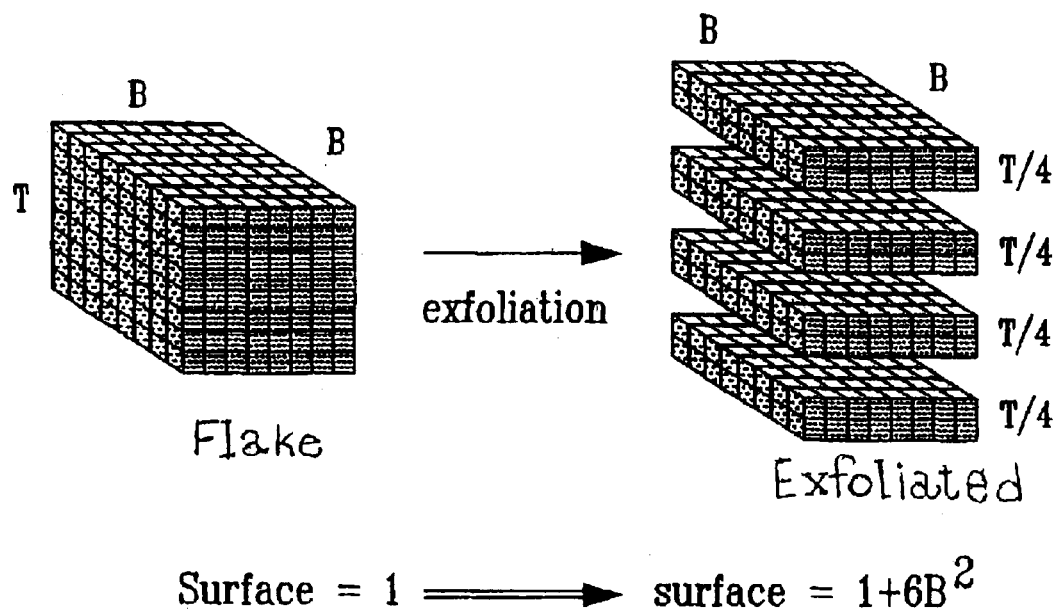
FIG_1
FIG_2

HYDROPHOBIC COMPOSITION AND USE ON A SUBSTRATE FOR PREVENTING ICE FORMATION AND CORROSION

FIELD OF THE INVENTION

The invention relates to compositions as well as a method for applying same on a substrate to make the latter hydrophobic and to prevent ice formation and, eventually, ice accumulation thereon, as well as its corrosion. More particularly, the invention concerns the use of graphite particles or crystallized carbon particles in a composite shape wherein the particles are oriented according to the basal plane, to make the substrate, for example an electric conductor, hydrophobic, and thus prevent all damages caused by ice accumulation and corrosion.

BACKGROUND OF THE ART

Natural and artificial graphites occur in a flake shape with two sides, comprising a basal plane and a plane commonly called edge. These products, which are relatively cheap and constitute good lubricants, are used for various applications in the steel and automobile industries. In the field of energy stocking, the graphite composite is known for its use as an anode in rechargeable or lithium-ion batteries. In graphites, lithium intercalation is done through the edge planes and not through the basal planes. During the anode processing, the process compulsorily goes through a calendering step, i.e. a lamination. This step, well-known to the man skilled in art, has for effect to orientate the graphite particles according to the basal planes, which makes the anode surface lubricating. In the battery industry, the addition of spherical metallic particles, carbon or the like, to the graphite composite prevents the orientation of the basal plane during the calendering. Graphite basal planes have an hydrophobic property which depends on the crystallinity of the carbon used. To increase this crytallinity, it is possible to process the carbon at a temperature higher than 1800° C.

Ice accumulation on electric installations or the like such as bridges, circulation lights, boats, etc. located in Nordic regions constitutes a major problem which can cause considerable damages, not only thereon, but on the whole network. Such accumulation, if it is not controlled, creates an excess weight which can cause failures on the transport and distribution electrical network, and ultimately involve heavy consequences due to its nature as a motor of the economy and public life of the electrical network. Protection of the electrical network as well as all other installations exposed to ice accumulation is therefore primordial. The approaches proposed in the aviation to prevent ice accumulation are of a mechanical, chemical or thermal type. Graphite has been used in the thermal approach in an amorphous shape (expanded graphite).

There therefore exists a need to resort to an efficient and cheap technique allowing to protect electrical distribution lines against ice formation during cold periods and corrosion.

SUMMARY OF THE INVENTION

The present invention has for object the use of the lubricating property of graphite due to its laminar structure with two planes, basal and edge, and other substances having the same property, to protect electrical networks from ice formation and corrosion.

The invention also has for object to use the basal plane of graphite which makes the latter hydrophobic in the battle against ice formation and corrosion on a metallic substrate.

Another object of the invention consists in using the preferential basal orientation of graphite particles or carbon particles treated at high temperature to repel water on a coating surface comprising graphite or carbon treated at a high temperature.

The invention concerns a composition intended for coating a substrate to make the latter hydrophobic and/or prevent ice formation and, eventually, ice accumulation thereon, and corrosion of the latter. The composition comprises particles as well as a vehicle in which the particles are incorporated, and is characterized in that the particles comprise at least one surface making them hydrophobic, and are oriented according to said surface when they are incorporated in the vehicle.

The invention also concerns a method for using this composition characterized in that the composition is applied on a substrate and the composition thus applied is treated to generate an hydrophobic and anti-corrosive coating.

BRIEF DESCRIPTION OF THE DRAWINGS

FIG. 1 is a schematic illustration showing the graphite exfoliation; and

FIG. 2 is an enlargement of exfoliated graphite particles, showing basal and edge planes.

DESCRIPTION OF THE PREFERRED EMBODIMENTS

According to a preferred embodiment of the invention, the particles have a crystalline structure and possess at least one cleavage plane that makes them hydrophobic. For example, all of them have a basal plan that makes them hydrophobic.

Advantageously, the particles comprise crystallized carbon, especially graphite or carbon processed at a temperature high enough to make it crystalline, the particles being oriented according to the basal plane. If graphite is used, it is advantageous that the latter has a high purity level, particularly at least 99.9%. It is indeed desirable that graphite practically contains no substances provoking nonconductivity, corrosion, or oxidation of the substrate on which it is deposited. Preferably, an exfoliated graphite is used.

When using a graphite in the composition according to the invention, it is advantageous to make the particles still more hydrophobic than what is yield by the basal plane. To achieve this, it is possible to add a fluorinated compound having the formula $C_xF_y$ where x and y are integers, especially $CF$, $C_2F$, $C_4F$. This compound can reduce the negative effect on the particle hydrophobia, particularly at the level of the edge sides.

The same results would be obtained by using a compound having a formula $MF_z$, where M represents an alkali or alkaline-earth metal and z represents 1 or 2. For example, it is possible to use $CaF_2$, $BaF_2$, $LiF$ or a mixture thereof. The graphite such as purified by the Hydro-Quebec process (see PCT/CA01/00233) shows, on the surface, the presence of fluorinated hydrophobic compounds of the type $CaF_2$ and the like, which causes an increase of the hydrophobia level by using graphite purified by the process mentioned in this patent.

The particles may also be formed of carbon fibers and they are then oriented in the vehicle in the direction of the fiber length.

The vehicle advantageously comprises an hydrophobic polymer capable of forming a composite with the particles.

Practically, it is preferable to use graphite particles having a size ranging between approximately 0.5 μm and 350 μm, a purity level ranging from 95 and 99.99% and an interplanar spacing d002 ranging between 3.35 to 3.40.

According to another preferred embodiment of the invention, the composition comprises a dispersion of graphite particles described in the previous paragraph in a solution comprising the hydrophobic polymer acting as a binder for the particles to constitute the composite. Advantageously, the graphite is present in the composition in a ratio ranging from 5 to 95% by weight.

According to another preferred embodiment of the invention, the polymer comprises a polyvinylidene fluoride, a polyvinylidene chloride, or a polytetrafluoroethylene, or a mixture thereof.

The composition can also comprise a simple dispersion of graphite particles in a random polymer, especially an ethylene oxide and propylene oxide copolymer, in a ratio ranging from 5 to 95% by weight.

The composition can also comprise a dispersion of graphite particles with a binder, preferably UV stable, intended to constitute the composite. This composite is then introduced in a solvent to constitute a painting. For example, the binder can comprise a polyester, a polyurethane, a polyacrylate or paraffin.

The composition can also comprise an additive promoting the flow and the flotation of graphite particles according to the basal orientation, particularly TEFLON brand polytetrafluoroethylene fluoropolymer or a stearate.

Another embodiment of the invention is that the composition comprises especially a melted mixture of graphite powder, solid and UV stable polymer resin, and solid additives, the mixture being grinded and conditioned for an application with an electrostatic rocket on a metallic substrate.

According to another embodiment, the type of graphite used is an exfoliated graphite. The use of this exfoliated graphite (FIG. 1), obtained following PCT/CA01/00233, in the composite increases the fraction of basal surfaces and reduces the edge ones such as detailed in the model (FIG. 2). Moreover, the addition of $CaF_2$ or another hydrophobic material can be interesting for coating the remaining edge sides to obtain a completely hydrophobic surface.

According to another preferred embodiment of the invention, the composition according to the invention is treated by flotation, by pressure or by a combination flotation-pressure to obtain a basal orientation of the particles, and the composition thus treated is applied on a substrate in a mechanic and/or an electrostatic manner to make an hydrophobic and anti-corrosive coating.

The choice of the binder used in the composite is important, the latter must also have an hydrophobic property (TEFLON brand polytetrafluoroethylene fluoropolymer, polyester, alkane, or other binder). Optimization of the size of graphite particles plays an important role in the coating homogeneity and in the hydrophobic aspect, such as it appears obvious to the man skilled in the art. The orientation of graphite particles according to the basal plane is made by flotation or by pressure exerted on the composite.

Such as described above, the composite particularly graphite-polymer can be used as such with or without solvent, or as a paint, with or without solvent.

For example, if it is desired to use it with a solvent, a graphite powder is dispersed in a solution using a binder dissolved in a solvent or a mixture of solvents. This binder can be of a polyvinylidene fluoride (PVDF) type, a polyvinylidene chloride (PVC) type, or a polytetrafluoroethylene (PTFE) type, or the like. The composition can comprise between 5% to 95% by weight of graphite. Spreading is made on a strip or a support by the Doctor Blade™ method, followed by calendaring on the same line. The film surface becomes bright, which is a sign of the basal orientation of the graphite particles.

If it is preferred to use a composite without solvent, it is possible, for example, to disperse the graphite powder in a polymer solution of a random ethylene oxide and propylene oxide copolymer type PEO/PPO. The graphite composition can vary between 5% and 95% by weight. Spreading is made on a strip or a support by the Doctor Blade™ method, followed by calendaring on the same line. The film surface becomes bright, which is a sign of the basal orientation of the graphite particles.

In a painting with a solvent mode, the method could consist in dispersing the graphite powder with a binder of a polyester, a polyurethane, an acrylate, an alkane or other UV stable binder type, in a solvent. Additives are added to this mixture to improve the flow and the flotation of graphite particles according to the basal orientation. The additives are of a diluting liquid type or of a polymer type, such as Teflon™, stearate or the like. The percentage of graphite depends on the desired conductivity.

Another way to use the painting mode is to use the composite without solvent. For example, this method consists in mixing and melting graphite powder and polymer resin of a polyester type, UV stable polyurethane with solid additives of a Teflon™, a stearate or the like. This graphite/resin mixture is grinded into a powder. The latter must be applied with an electrostatic rocket on a metallic substrate. During polymer melting, graphite particles are aligned according to the basal plane.

EXAMPLES

The invention will now be illustrated by the following examples, given as an illustration of the invention and without limitation.

Example 1

The PVDF binder is solubilized in NMP (n-methyl pyrrolidone). A mixture 80/20 of the acetone/toluene solvents is added to the paste PVDF-NMP to form the spreading composition. The graphite powder is dispersed in the spreading composition in a weight ratio 90:10. This mixture is applied on a copper collector by the Doctor Blade™ method. The electrode is dried with an infra-red lamp at 65° C., followed by calendaring on the same manufacturing line. The surface of these graphite films has hydrophobic properties.

Example 2

In this example, two mixtures (A) and (B) are prepared. Mixture (A) is composed of polyester, thermosealable resin and 20% of $TiO_2$ and 2–6% by weight of graphite. The mixture (B) is composed of a thermoplastic resin and 10 to 20% by weight of graphite. Both compounds are extruded and pulverized separately. 85% of compound (A) is mixed with 15% of compound (B). This powder is applied by an electrostatic process on a substrate. The latter is exposed to heat in order to melt and cook the powder.

Although the present invention has been described with specific implementations, it understood that several variations and modifications can be grafted to said implementations, and the present application aims to cover such modifications, uses or adaptations of the present invention following, in general, the invention principles and including all variations of the present description which will become known or conventional in the activity field in which the present invention is found, and which can be applied to the essential elements mentioned above, in accordance with the scope of the following claims.

What is claimed is:

1. An ice accumulation reduction composition adapted to coat a substrate to make the substrate hydrophobic and reduce ice formation and ice accumulation on said substrate and corrosion of the substrate, said composition comprising carbon particles and a vehicle comprising a hydrophobic polymer in which the carbon particles are incorporated, wherein said carbon particles have a crystalline structure and have at least one cleavage plane making them hydrophobic.

2. The composition according to claim 1, wherein said particles have a basal plane, said basal plane constituting said cleavage plane making said particles hydrophobic.

3. The composition according to claim 2, wherein said crystallized carbon comprises graphite.

4. The composition according to claim 3, wherein the graphite is 99.9% pure.

5. The composition according to claim 2, wherein said crystallized carbon comprises exfoliated graphite.

6. The composition according to claim 5, wherein the graphite is 99.9% pure.

7. The composition according to claim 6, wherein the exfoliated graphite comprises side edges and the side edges are coated with a fluorinated compound of formula $C_xF_y$ where x and y are numbers higher than or equal to 1.

8. The composition according to claim 3, wherein said composite further comprises a fluorinated compound of formula $C_xF_y$ where x and y are numbers higher than or equal to 1.

9. The composition according to claim 3, wherein said composite further comprises a compound of formula $MF_z$ where M is an alkali or alkaline-earth metal and z represents 1 or 2.

10. The composition according to claim 7, wherein said $MF_z$ formula compound is $CaF_2$, $BaF_2$, LiF or a mixture thereof.

11. The composition according to claim 1, wherein the particles are formed of carbon fibers and are oriented substantially parallel to each other.

12. The composition according to claim 1, wherein said vehicle comprises a hydrophobic polymer that forms a composite with said particles.

13. The composition according to claim 11, wherein the particles are graphite particles having a size ranging between approximately 0.5 µm and 350 µm, a purity level ranging between 95 and 99.99% and an interplanar spacing ranging between 3.35 and 3.40.

14. The composition according to claim 12, comprising a dispersion of graphite particles in a solution comprising said polymer acting as a binder for said particles to constitute said composite.

15. The composition according to claim 13, wherein the graphite is present in the composition in a ratio ranging from 5 to 95% weight.

16. The composition according to claim 14, wherein the polymer is polyvinylidene fluoride, polyvinylidene chloride, or polytetrafluoroethylene.

17. The composition according to claim 12, comprising a simple dispersion of graphite particles in a random liquid copolymer, in a ratio ranging from 5 to 95% weight.

18. The composition according to claim 16, wherein the copolymer is an ethylene oxide and propylene oxide copolymer.

19. The composition according to claim 12, comprising a dispersion of graphite particles in a solvent comprising a binder.

20. The composition according to claim 18, wherein said binder is UV stable.

21. The composition according to claim 19, wherein said binder is a polyester, a polyurethane, a polyacrylate or paraffin.

22. The composition according to claim 20, further comprising an additive promoting flow and flotation of graphite particles according to the basal orientation.

23. The composition according to claim 21, wherein the additive is a polytetrafluoroethylene fluoropolymer or a stearate.

24. The composition according to claim 12, wherein said composition comprises a melted mixture of graphite powder, solid and UV stable polymer resin, and solid additives, and wherein the mixture is ground and conditioned for an application by an electrostatic rocket on a metallic substrate.

25. A method to prevent ice accumulation and/or corrosion formation on a substrate, comprising preparing a composition according to claim 1 and applying said composition on a substrate to make a hydrophobic and anti-corrosive coating.

26. A method to prevent ice accumulation and/or corrosion formation on a substrate, comprising preparing a composition according to claim 2 by flotation, by pressure or by a flotation-pressure combination to obtain a basal orientation of said particles, and applying said composition on a substrate mechanically and/or electrostatically to make a hydrophobic and anti-corrosive coating.

* * * * *

UNITED STATES PATENT AND TRADEMARK OFFICE
CERTIFICATE OF CORRECTION

PATENT NO. : 6,974,551 B2
DATED : December 13, 2005
INVENTOR(S) : Karim Zaghib et al.

It is certified that error appears in the above-identified patent and that said Letters Patent is hereby corrected as shown below:

<u>Title page,</u>
Item [75], Inventors, add:
-- Monique Masse, Lonqueuil, (CA) --.

Signed and Sealed this

Fourteenth Day of February, 2006

JON W. DUDAS
*Director of the United States Patent and Trademark Office*